July 18, 1967 C. E. ANDREASEN 3,331,965

CONSTANT CURRENT SIGNAL GENERATOR HAVING TRANSISTOR BURNOUT PROTECTION DEVICE

Filed June 24, 1963

INVENTOR
C.E. ANDREASEN
BY
Forest B. Hitchcock
HIS ATTORNEY

United States Patent Office 3,331,965
Patented July 18, 1967

3,331,965

CONSTANT CURRENT SIGNAL GENERATOR HAVING TRANSISTOR BURNOUT PROTECTION DEVICE

Charles E. Andreasen, Rochester, N.Y., assignor to The General Signal Corporation, Rochester, N.Y., a corporation of New York Filed June 24, 1963, Ser. No. 289,893
4 Claims. (Cl. 307—88)

This invention relates to solid state signal generators and more particularly to a radio frequency signal generator with constant current output.

Radio frequency signal generators find wide application as driver circuits for use with multiaperture ferrite cores. Such signal generators provide radio frequency power to individual cores, which are then utilized for switching this power for utilization purposes. The switched radio frequency energy may be utilized to actuate a subsequent switching device, such as a relay, in order to provide large values of power gain.

When a multiaperture core is switched, it is driven from one state of flux saturation to another state of flux saturation where, for example, the impedance ratio is about 5 to 1 when switched from a clear state to a set state. When additional cores are added to the circuit driven from the radio frequency signal generator, the total load impedance on the signal generator may be either increased or decreased, depending upon whether the cores are driven in series or in parallel.

Multiaperature ferrite cores are sensitive to the amplitude of R-F current applied thereto. If the R-F current applied through any particular aperture is above or below certain amplitude limits, the core may either switch to an undesired state, or not switch at all. Thus, it is apparent that a constant current source is required for driving these cores.

Accordingly, one object of this invention is to provide a new and improved signal generator.

Another object is to provide a constant current radio frequency signal generator.

Another object is to provide a radio frequency signal generator utilizing current feedback proportional in amplitude to current drawn by a load in order to stabilize the amplitude of load current.

Another object is to provide a signal generator with automatic protection against burn-out of a pair of output transistors in the event the load circuit becomes open-circuited.

The invention contemplates a signal generator comprising an oscillator circuit coupling an output signal of radio frequency energy through amplifier means to a load which may be of varying impedance. Current sensing means are coupled to the load circuit and feed a signal proportional to the load current back to the oscillator for control of the amplitude of oscillations produced therefrom.

The foregoing and other objects and advantages of the invention will become apparent from the following detailed description when read in conjunction with the accompanying drawing in which.

Figures 1, 2:
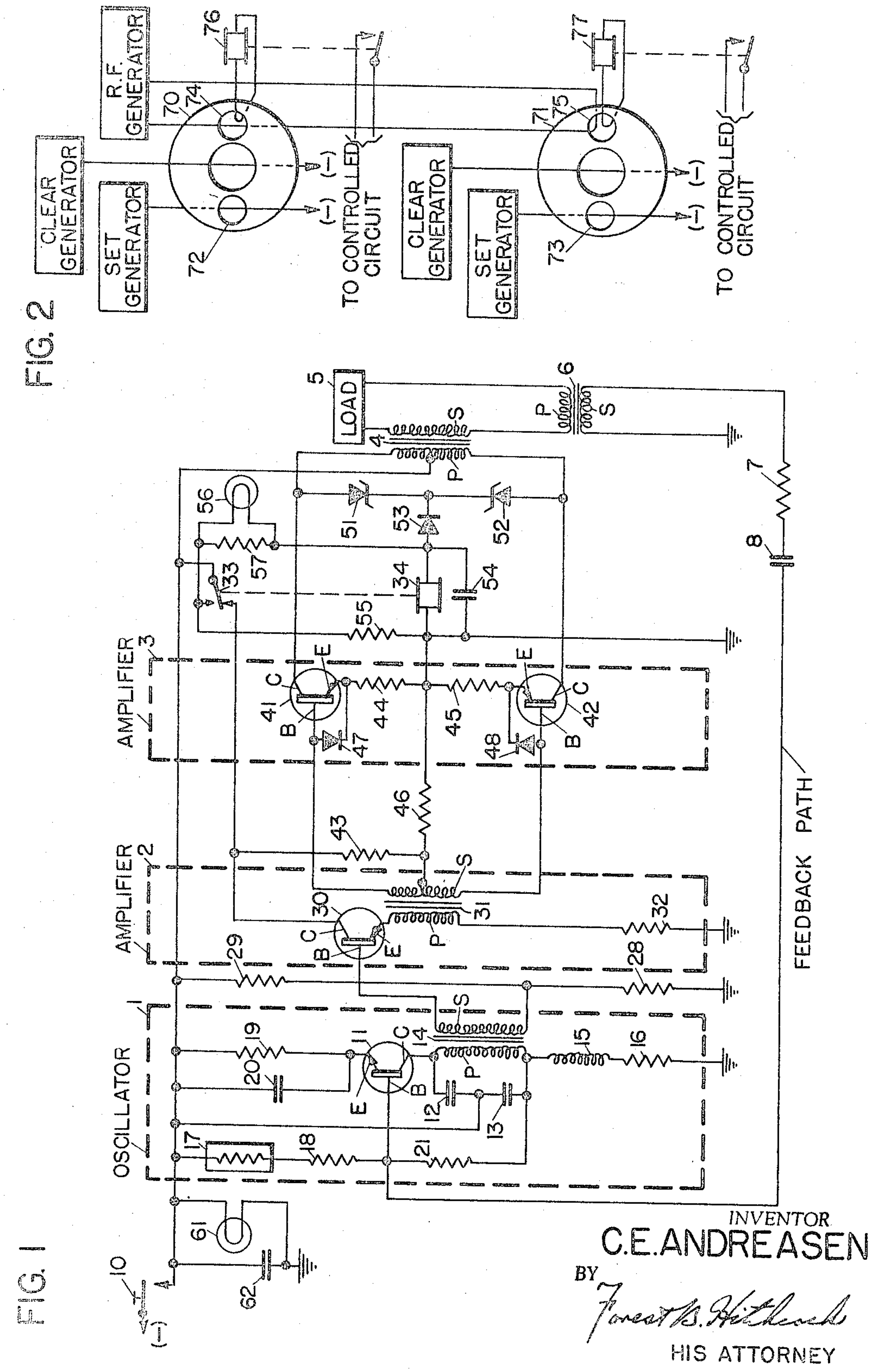
FIG. 1 is a schematic diagram of the preferred embodiment of the invention.
FIG. 2 is a schematic diagram showing use of the radio frequency generator of FIG. 1 in connection with multiaperture ferrite cores.

Turning now to FIG. 1 there is shown an oscillator circuit 1 coupling an output signal to a buffer amplifier 2. The output of buffer amplifier 2 is coupled to the input of a push-pull amplifier 3, which operates as a class B amplifier. The output of amplifier 3 is coupled through a transformer 4 to a load circuit 5. The primary winding P of a current transformer 6 is connected in series with the load. The secondary winding S of transformer 6 is coupled through a series-connected resistor 7 and capacitor 8 to the base B of a transistor 11 in oscillator circuit 1.

Although the oscillator may comprise any of a large number of suitable configurations, oscillator 1 is shown as a conventional Colpitts oscillator. Frequency of oscillation therefor is controlled by a tuned tank circuit comprising a pair of series-connected capacitors 12 and 13 coupled across the primary winding P of a transformer 14. The tank circuit is coupled in series between the collector C of transistor 11 and an inductor 15 used as a radio frequency choke to prevent grounding of the generated signal through a collector bias resistor 16 coupled thereto.

Base bias is applied through switch 10 when in a closed position from the negative side of the power supply through a series-connected thermistor 17 and resistor 18. This thermistor and resistor combination provides temperature compensation for the oscillator.

Emitter bias is supplied through a resistor 19 shunted by a radio frequency bypass capacitor 20. Collector to base feedback is supplied to the base B of transistor 11 from the tuned tank circuit through a feedback resistor 21.

Output signals produced by oscillator 1 are coupled from the secondary winding S of transformer 14 to the base B of transistor 30 in the circuit of buffer amplifier 2. The base B of transistor 30 is connected through the secondary winding S of transformer 14 to a biasing circuit including resistors 28 and 29. The primary winding P of a transformer 31 is coupled between the emitter E of transistor 30 and ground through a series-connected emitter bias resistor 32. The circuit of amplifier 2 is therefore seen to be an emitter follower amplifier employed for driving amplifier 3. An emitter follower amplifier is well suited to use as a buffer stage because of its high stability, its high current gain, and its high input impedance which minimizes loading on the oscillator.

The collector C of transistor 30 is coupled to the negative side of the power supply when switch 10 is closed through a back contact 33 of a relay 34, which during normal operation of the circuit is in a dropped away condition. This will be pointed out as the description progresses.

Opposite sides of the secondary windings S of transformer 31 are coupled to the bases B of respective transistors 41 and 42. Transistors 41 and 42 comprise push-pull amplifier 3. Negative bias is supplied to a center tap on the secondary winding S of transformer 31 through a bias resistor 43 coupled to back contact 33 of relay 34. This negative bias is therefore coupled to the bases B of transistors 41 and 42 through the secondary winding S of transformer 31. The emitter E of transistors 41 and 42 are coupled to emitter bias resistors 44 and 45 respectively which are connected to ground. The base return resistor 46 is also connected to ground at the common point of resistor 44 and 45. The other side of resistor 46 is connected to the common point of resistor 43 and the center tap of the secondary S of transformer 31. Resistors 43 and 46 function to establish the bias condition for the operation of transistors 41 and 42 in a class B state.

Due to the low-rated value of the base B to emitter E voltage of transistors 41 and 42, diodes 47 and 48 coupled in the forward biased direction from the base B to the emitter E of transistors 41 and 42 act to prevent a breakdown from base to emitter by conducting around this junction if the reverse voltage due to transients, etc. exceed the diode voltage drop.

The collector C of each transistor 41 and 42 is coupled to a separate side of the primary winding P of transformer 4. The primary winding P of transformer 4 is center tapped from which tap it is coupled to the negative side of the power supply, thereby providing a complete path for collector current to flow through transistors 41 and 42. The secondary winding S of transformer 4 is coupled in series with load 5 and the primary winding B of current transformer 6, as previously mentioned.

A pair of zener diodes 51 and 52 have their cathodes coupled together. The anode of zener diode 51 is coupled to the collector C of transistor 41, while the anode of zener diode 52 is coupled to the collector C of transistor 42. The cathode of a diode 53 is coupled to the cathodes of the zener diodes, while the anode of diode 53 is coupled to one side of relay 34. The other side of the relay is coupled to the common connection between resistors 44 and 45 and to ground. A capacitor 54 is connected in shunt with relay 34. This capacitor 54 prevents relay 34 from becoming energized due to momentary surges of current through relay 34. Front contact 33 of relay 34 is coupled to the common point between emitter resistors 44 and 45 through resistor 55. An indicator, such as a lamp 56 shunted by resistor 57 is connected between front contact 33 and the anode of diode 53.

An indicator lamp 61 is coupled between the front contact of switch 10 and ground for providing a visual indication of the presence of voltage applied to the signal generator. A capacitor 62 is coupled between the front contact of the switch 10 and ground for the purpose of decoupling R-F from the power supply.

In operation, upon closing switch 10, bias voltages are applied to the circuits. Oscillator 1 produces an alternating voltage output which is amplified through buffer amplifier 2 and applied to push-pull amplifier 3. As in common push-pull circuit operation, when the base B of transistor 41 swings positive, the base B of transistor 42 swings negative, and vice versa. Correspondingly, the collectors C of transistors 41 and 42 alternatingly swing positive and negative, thereby applying an alternating voltage to the primary winding P of output transformer 4. Alternating current is then applied to the load, passing in series through the primary winding P of current feedback transformer 6. The secondary winding S of transformer 6 is RC coupled to the base B of oscillator transistor 11 in such fashion that as output current from the secondary winding S of transformer 4 increases in amplitude, negative-going current is applied to the base B of transistor 11, decreasing the amplitude of oscillations produced therefrom. On the other hand, if the load current decreases in amplitude, a positive-going current is applied to the base B of transistor 11, thereby increasing the amplitude of oscillations produced therefrom. Thus, it can be seen that negative feedback is utilized for stabilizing the amplitude of output current produced from the radio frequency signal generator.

In normal operation of the circuit of FIG. 1, zener diodes 51 and 52 are non-conducting. Therefore, relay 34 remains in a dropped away condition. However, in the event the load circuit is opened, output voltage produced from amplifier 3 swings to an amplitude in excess of the zener breakdown voltage of the zener diodes. This causes conduction through diodes 51 and 52, thereby picking relay 34.

Pick up of relay 34 opens back contact 33, removing collector voltage from transistor 31 and thereby removing input voltage from amplifier 3. Moreover, bias voltages for transistors 41 and 42 are also removed thereby.

Pick up relay 34 causes front contact 33 to close, thereby grounding the negative side of the power supply through current limiting resistor 55. In addition, current flows from ground through relay 34 and diode 53 to opposite sides of the primary winding P of transformer 4 through zener diodes 51 and 52, which now exhibit their impedance reverse characteristics. In this fashion, relay 34 remains stuck in its picked up condition.

The open circuit in the load circuit is indicated by actuation of indicator 56, shown as a lamp. In order to reset the circuit, switch 10 must be opened momentarily, permitting relay 34 to drop away. At this point, when the output circuit has been repaired, closing of switch 10 again produces output current through the load.

FIG. 2 illustrates typical connections through a pair of multiaperture magnetic cores 70 and 71 serving, for example, as the load 5 shown in FIG. 1. The respective cores are set through their input minor aperture 72 and 73 with individual set voltages. Radio frequency energy from the circuit of FIG. 1 is coupled through their respective output minor apertures 74 and 75, controlling respective relays 76 and 77 with radio frequency energy. Thus, in the event core 70 is set, relay 76 is picked up, while if core 71 is set, relay 77 is picked up. When a pulse is passed through the major aperture of either core from a clear generator, the relay coupled to the output minor aperture of the cleared core is dropped away.

Since the cores shown in FIG. 2 may be independently set and cleared, it is apparent that the input impedance presented to the output of the radio frequency signal generator may vary over a wide range. As the number of cores driven from the radio frequency signal generator is increased, this range of impedance variation also increased. Thus, the need for a constant current radio frequency signal generator to drive these cores is apparent. However, those skilled in the art will readily recognize the additional utility of the radio frequency signal generator shown in FIG. 1; that is, any application requiring use of a constant current radio frequency signal generator may be fulfilled by the circuit of FIG. 1 within load impedance limits.

Thus, there has been shown a constant current radio frequency signal generator for operation with varying load impedances. The circuit has built-in protection against power output transistor burn out due to opening of the load circuit. Moreover, the circuit can be operated in a standby condition if relay 34 is removed, wherein only the oscillator is in operation, in order to conserve power. The circuit is compact, rugged and has minimal power requirements.

Although but one embodiment of the present invention has been described, it is to be specifically understood that this form is selected to facilitate in the disclosure of the invention rather than to limit the number of forms which it may assume; various modifications and adaptations may be applied to the specific form shown to meet the requirements of practice, without in any manner departing from the spirit or scope of the invention.

What I claim is:

1. A signal generator for providing a constant current output to an electrical load having different impedance conditions comprising in combination, an oscillator for producing an alternating current output, amplifier means coupled to said oscillator for increasing the magnitude of said oscillator output, a transformer for coupling said amplifier means to said electrical load, switching means electrically connected across the primary winding of said transformer for conducting current and removing the operating bias voltage from said amplifier means whenever said electrical load becomes open circuited, and sensing means responsive to the current coupled to said electrical load for feeding back a signal proportional to the difference between the amplitude of the current coupled to said electrical load and the amplitude of said constant current to the oscillator with such polarity as to control said oscillator alternating current output in such manner as to maintain a substantially constant current to said electrical load.

2. A signal generator for providing a constant current output to operate a load selectively settable to one of a plurality of different impedance conditions comprising, in combination, oscillator means for producing an alternating current output having a given amplitude of oscillation, output means for coupling the oscillator output to said load, said output means including an output transformer having a primary winding and a secondary winding through which the output of said oscillator means is coupled to said load, means shunting said primary winding responsive to pass current only where said load becomes open circuited, said output means also including relay means responsive to the operation of said means for removing bias voltages from said output means.

3. The signal generator according to claim 2 wherein said output means includes a pair of transistors arranged in a push-pull circuit for amplifying the alternating current output of said oscillator means, said relay means when responsive to the operation of said means being effective to remove the bias voltages from said pair of transistors for preventing operation thereof.

4. The signal generator according to claim 3 wherein said means includes a pair of zener diodes, one for shunting each of said pair of transistors.

References Cited

UNITED STATES PATENTS

| | | | |
|---|---|---|---|
| 2,451,021 | 10/1948 | Detuno | 331—183 |
| 2,775,699 | 12/1956 | Felch | 331—183 |
| 2,991,430 | 4/1961 | Allred et al. | 331—183 |
| 3,200,348 | 8/1965 | Kammiller et al. | 331—183 |

BERNARD KONICK, *Primary Examiner.*

S. M. URYNOWICZ, *Assistant Examiner.*